United States Patent [19]

Bean et al.

[11] Patent Number: 4,844,880
[45] Date of Patent: Jul. 4, 1989

[54] PROCESS FOR THE MANUFACTURE OF SODIUM METABISULFITE

[75] Inventors: Samuel L. Bean, Jamesville; Mark D. Dulik, Camillus; Robert J. Wilson, Baldwinsville, all of N.Y.

[73] Assignee: HMC Patents Holding Co., Inc., Hampton, N.H.

[21] Appl. No.: 813,795

[22] Filed: Dec. 27, 1985

[51] Int. Cl.[4] .......................... C01B 17/62; C01D 5/14
[52] U.S. Cl. .................................... 423/519; 423/202; 423/512 A; 23/295 R; 23/302 R; 23/302 F
[58] Field of Search ................... 423/512, 512 A, 519, 423/202; 23/295 R, 302 R, 302 T

[56] References Cited

U.S. PATENT DOCUMENTS

| | | | |
|---|---|---|---|
| 1,484,818 | 2/1924 | Drewsen | 423/519 |
| 2,656,249 | 10/1953 | Gray et al. | 423/519 |
| 2,862,887 | 12/1958 | Boyer | 23/302 T |
| 3,361,524 | 1/1968 | Spormann et al. | 423/519 |
| 3,860,695 | 1/1975 | Metzger et al. | 423/519 |
| 3,995,015 | 11/1976 | Bean | 423/519 |
| 4,112,061 | 9/1978 | Hoffmann et al. | 423/519 |

OTHER PUBLICATIONS

Kirk et al., Encyclopedia of Chemical Technology, 3th edition, John Wiley and Sons, New York 1983, vol. 22, p. 152.

*Primary Examiner*—John Doll
*Assistant Examiner*—Robert M. Kunemund
*Attorney, Agent, or Firm*—Arthur J. Plantamura

[57] ABSTRACT

An improved process for the manufacture of sodium metabisulfite is provided. In this process, the chemical reaction forming sodium bisulfite solution is carried out separately from the crystallization of sodium metabisulfite. The crystallization step is carried out without chemical alteration and without pH adjustment.

5 Claims, 4 Drawing Sheets

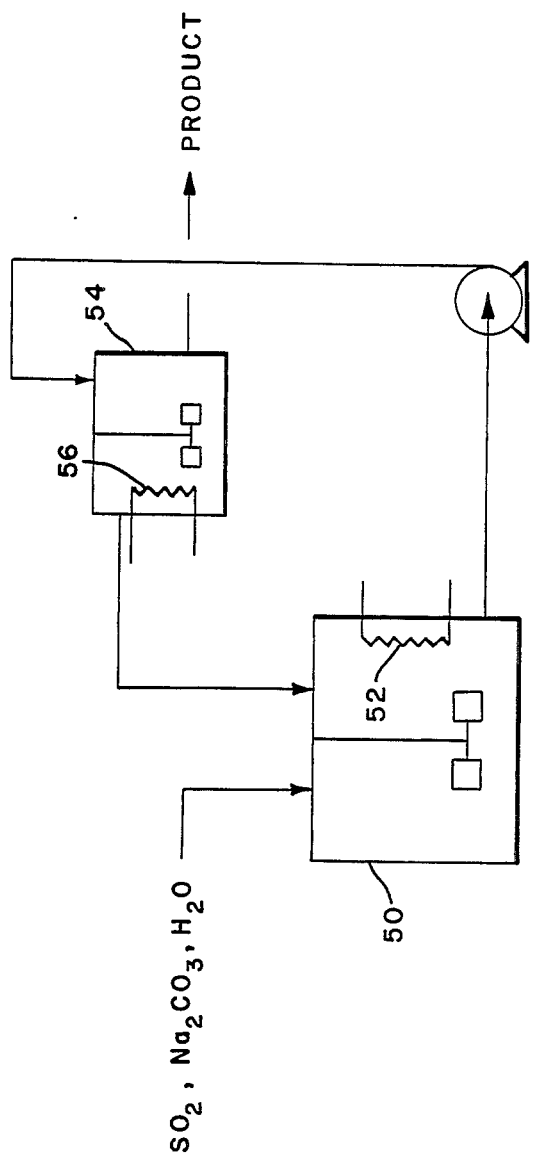

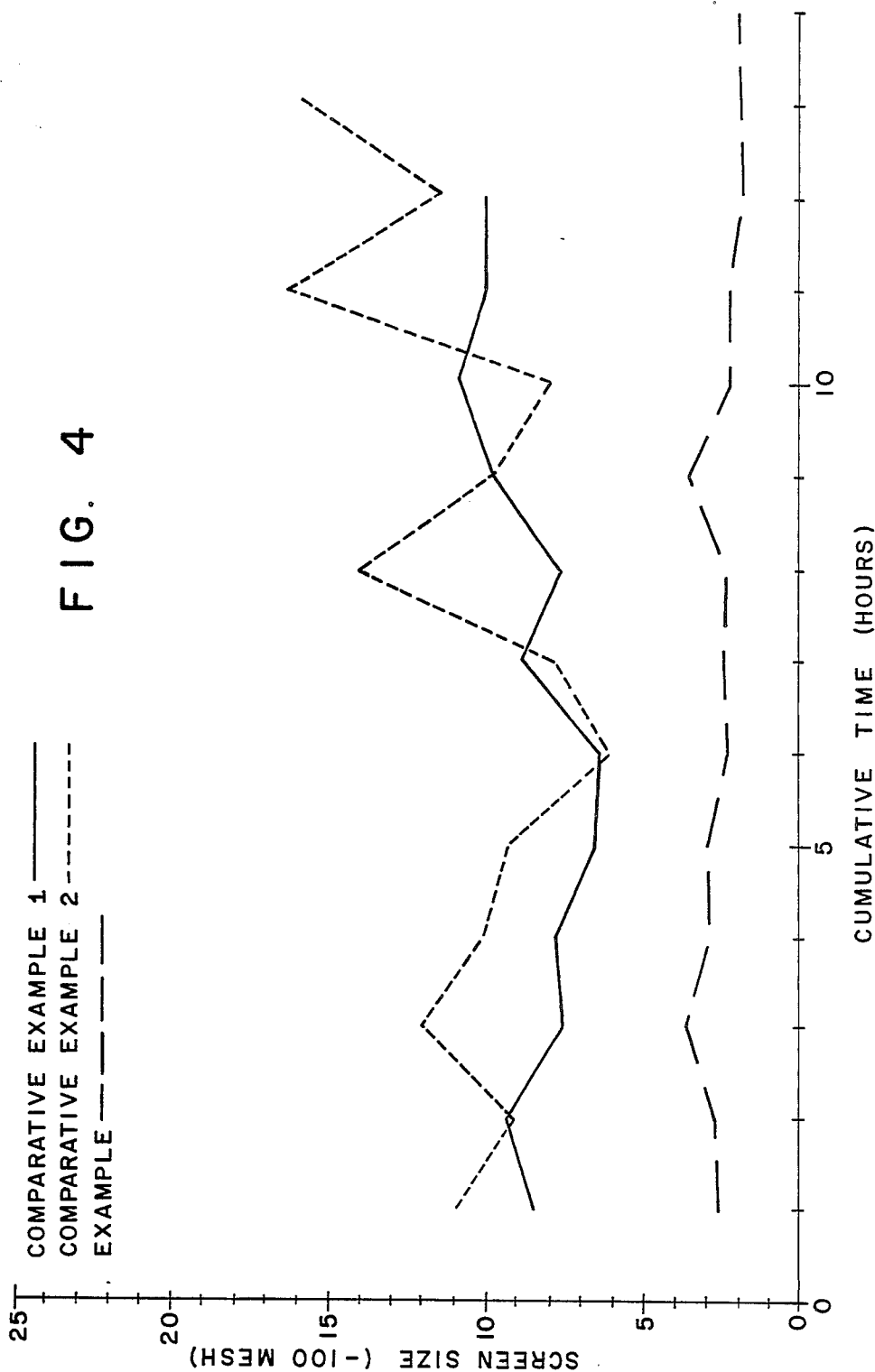

PROCESS FOR THE MANUFACTURE OF SODIUM METABISULFITE

TECHNICAL FIELD

The present invention relates to the manufacture of sodium metabisulfite.

BACKGROUND ART

Processes for the manufacture of sodium or potassium metabisulfite are illustrated by U.S. Pat. Nos. 3,361,524, 3,860,695, 3,369,866 and 3,995,015.

U.S. Pat. No. 3,361,524 covers the simultaneous manufacture of sodium metabisulfite and sodium sulfite in a process having three reaction stages. In the first stage, sulfur dioxide and caustic soda are reacted to form sodium metabisulfite. The second stage reacts caustic soda with mother liquor and sulfur dioxide from the first stage to precipitate sodium sulfite. In the third stage, more caustic soda is added to crystallize more sodium sulfite.

U.S. Pat. No. 3,860,695 relates to the manufacture of sodium metabisulfite from sodium hydroxide or carbonate and sulfur dioxide. This process uses two stages of gas absorption. The first stage of sulfur dioxide absorption is carried out in a "jet scrubber". The gas is then forced to pass beneath the liquid level in the main body of the same vessel. This step constitutes a second stage of gas absorption. The pH is maintained in the range of 4 to 5. The sulfur dioxide content of the exit gas is 3.7% by volume, and thus further processing is required.

In U.S. Pat. No. 3,369,866, potassium hydroxide or carbonate and sulfur dioxide are reacted in potassium bisulfite solution at a pH of 4 to 7.5, and a temperature of 50° to 80° C. The solution is transferred to a second vessel where its pH is reduced to 5.5 by the addition of more sulfur dioxide in order to prevent precipitation of potassium sulfite, and the solution is cooled to 15° to 25° C. to obtain a crop of potassium metabisulfite crystals. The main concerns are to avoid product oxidation and the inclusion of sulfite in the product. No mention is made of crystal size.

The process of U.S. Pat. No. 3,995,015 is a considerable simplification and improvement over the prior art. Only two processing vessels are used, and the formation as an intermediate of heavy slurries of sodium sulfite is advantageously avoided. The process uses a sulfur dioxide-containing gas and soda ash as starting materials. Most sulfur dioxide absorption and product crystallization occur simultaneously in a reactor. In a scrubbing vessel, the 10 to 20% of the feed sulfur dioxide stream not absorbed in the reactor is absorbed in a slurry of said ash in mother liquor. However, the sodium metabisulfite product typically contains 20 to 30% minus U.S. Standard 100 mesh screen, has the characteristic odor of sulfur dioxide, and is irritating to those physically handling it. As a result, dust masks, respirators and fairly elaborate ventilation systems should be used.

Therefore, there is a continuing need for an improved process for the manufacture of sodium metabisulfite. In particular, there is a need for a process that produces a coarser product. Such a product should be less irritating to those handling it. Thus, the discovery of such an improved process would constitute a significant contribution to the art.

DISCLOSURE OF THE INVENTION

It is accordingly an object of the present invention to provide an improved process for the manufacture of sodium metabisulfite.

It is a further object to provide a process of this type that produces a product less irritating to those handling it.

Additional objects, advantages and novel features of the present invention are set forth in the description that follows, and in part will become apparent to those skilled in the art upon examination of the following description or may be learned by practice of the invention.

To achieve the foregoing objects and in accordance with the purpose of the present invention, as embodied and broadly described herein, there is provided an improved process for the manufacture of sodium metabisulfite. This process includes in a first vessel, forming a solution of sodium bisulfite close to saturation from a reaction liquor. The sodium bisulfite solution is formed at an elevated temperature that prevents crystallization of sodium metabisulfite from the solution. In a separate vessel, sodium metabisulfite is crystallized from the solution, which is at a lower temperature without chemical alteration and without pH adjustment. Afterwards, the sodium metabisulfite is recovered.

BRIEF DESCRIPTION OF THE DRAWING

Reference is now made to the accompanying drawing, which forms a part of the specification of the present invention.

FIG. 3 is a schematic flow diagram for the process carried out in the Example; and FIG. 4 graphically depicts the results of the Example and the two Comparative Examples.

BEST MODE FOR CARRYING OUT THE INVENTION

As explained earlier, the process of U.S. Pat. No. 3,995,015 uses a sulfur dioxide-containing gas and soda ash as starting materials. Most sulfur dioxide absorption-chemical reaction and product crystallization occur simultaneously in a reactor. The sodium metabisulfite has the characteristic odor of sulfur dioxide. The finer-sized cyrstals and dust have more of this odor and are, therefore, more irritating.

We have now surprisingly discovered an improvement in the technology of U.S. Pat. No. 3,995,015 which comprises carrying out the chemical reaction to produce sodium bisulfite solution, separately from the crystallization of sodium metabisulfite. The resulting product is a coarser sodium metabisulfite, with much less odor and irritating dust, compared to the product of U.S. Pat. No. 3,995,015. By the term "coarser", we further mean that the product includes only about 1 to 5% of −100 mesh screen. While not wishing to be bound by any theory, we believe that a process in which a gas is absorbed and crystallization takes places simultaneously, produces excessive nucleation, which results in finer-sized crystals.

We have found that a solution of sodium bisulfite close to saturation is formed without crystallization of sodium metabisulfite, if the reaction liquor is at an elevated temperature (between about 50° to 60° C. and preferably about 60° C.) that prevents the crystallization. Furthermore, the pH of the reaction liquor should be maintained in the range of about 4.8 to 5.2 and preferably between about 5.0 to 5.2. This liquor is fed to another vessel in which it is cooled to cause product crystallization. The crystallizer can be operated at any temperature which will give a reasonable difference in solubility as compared to the reactor. Generally, the operating temperature range for the crystallizer is from about 20°-50° C., preferably about 45° C. The range of percent solids by volume is preferably from about 20 to 60%. No chemical alteration or pH adjustment of the reaction liquor in the crystallizer is required or desired. Thereafter, the mother liquor is advantageously flowed back to the reaction vessel. By the term "close to saturation" is meant that the solution is below saturation and free of crystals.

Figure 1:
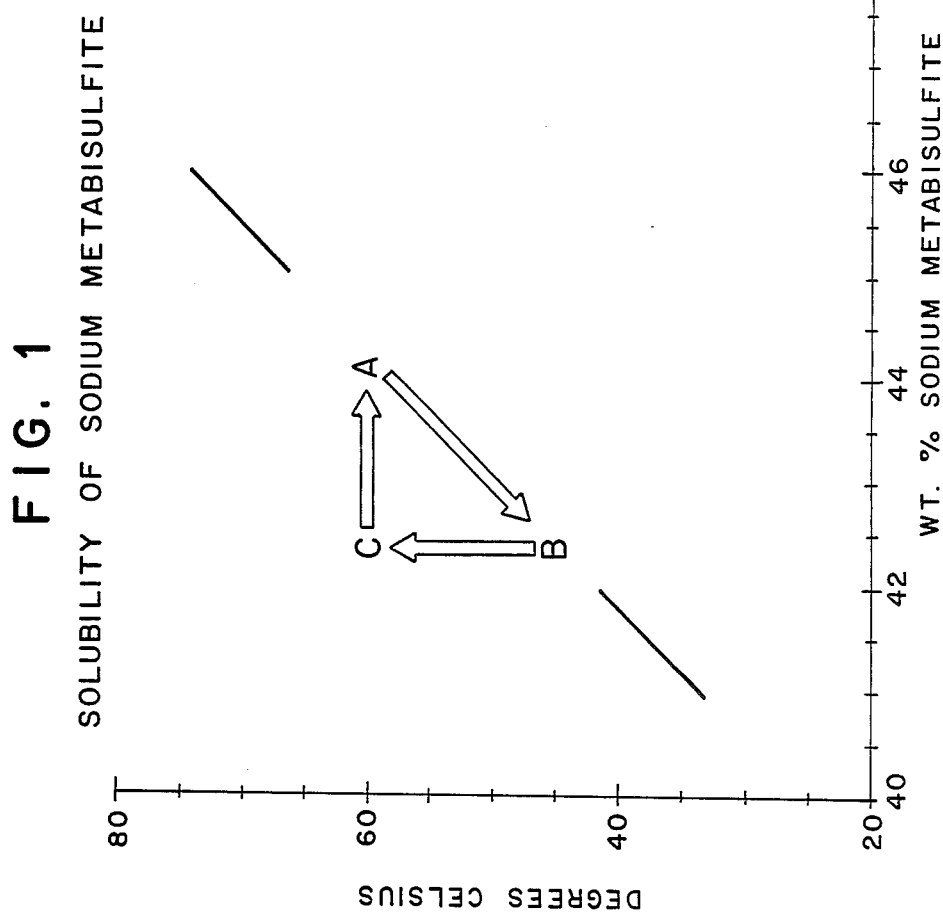
FIG. 1 shows a portion of the sodium metabisulfite solubility curve.

As can be seen from FIG. 1, the solubility of sodium metabisulfite is about 44.2% at 60° C. and about 42.4% at 45° C. For purposes of illustrating the invention with reference to FIG. 1, the sulfur dioxide absorption-chemical reaction would be carried out while at the same time adding heat to maintain a reaction liquor temperature of 60° C. Because the solubility of sodium metabisulfite is increased to 44.2% at 60° C., the crystallization of sodium metabisulfite would be prevented.

The reaction liquor at 60° C. and 44.2% solution, which is represented by Point A in FIG. 1, would be fed to a crystallizer, in which the liquor would be cooled to 45° C. while in contact with a suspended bed of sodium metabisulfite. The liquor would desupersaturate by growing on the existing crystals until its solution strength decreased to 42.4%, the solubility at 45° C. This liquor, which is represented by Point B, would overflow the crystallizer and be returned to the reaction vessel.

In the reaction vessel, the temperature of the liquor would be raised to 60° C. This liquor is represented by Point C. Sufficient sulfur dioxide and soda ash would be added to raise the solution strength to 44.2%. This solution is represented by Point A. The process thus could be continuous and cyclical.

Figure 2:
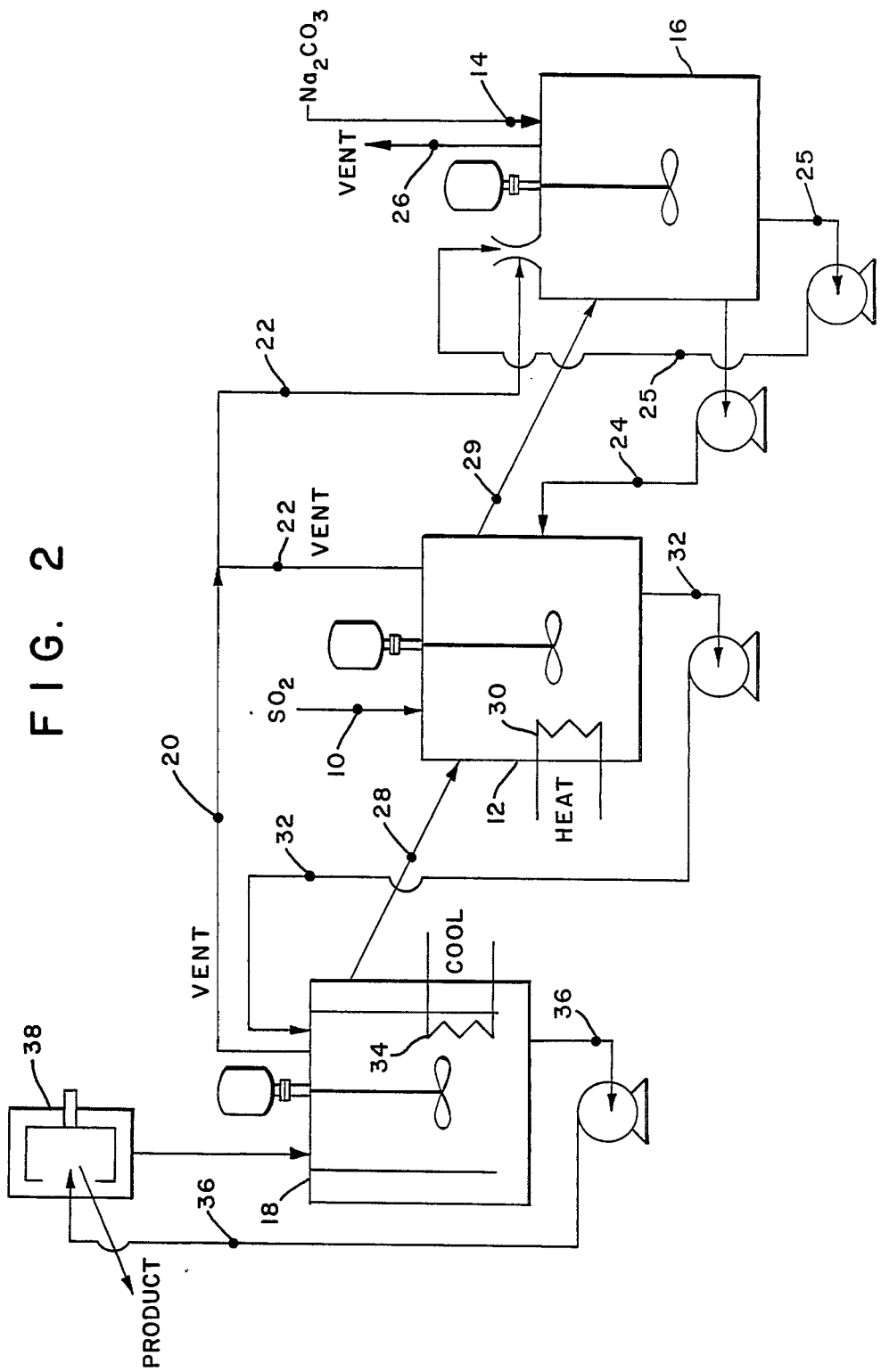
FIG. 2 is a simplified flow sketch for a preferred embodiment of a process in accordance with the present invention.

Referring now to the simplified flow sketch shown in FIG. 2, a stream of sulfur dioxide-containing gas is passed by line 10 to a reactor 12, and soda ash is fed by line 14 to a scrubber 16. Mother liquor overflows from reactor 12 by line 29 to scrubber 16, and forms a slurry with the soda ash there. A stream of the scrubber slurry sufficient to react with the sulfur dioxide and to maintain a liquor pH of 5.0 to 5.2 in reactor 12 is pumped to the reactor via line 24.

Sulfur dioxide not absorbed in reactor 10 is drawn to scrubber 16 via line 22 by means of a venturi ejector, and is absorbed by the alkaline slurry. Inert gases are then vented by line 26 from scrubber 16. Mother liquor at 45° C. and 42.4% solution flows from crystallizer 18 by line 28 to reactor 12, in which it is heated by a heating coil 30° to 60° C. and its solution strength increased to 44.2% by the sulfur dioxide and soda ash.

The reaction liquor at 60° C. and 44.2% strength is fed by line 32 to crystallizer 18, in which the liquor is cooled to 45° C. by a cooling coil 34. The difference in solubility, 44.2% versus 42.4%, is manifested as growth on a bed of suspended crystals in the crystallizer.

Control of pH in reactor 12 may be accomplished by regulating the ratio of sulfur dioxide to alkaline slurry fed to the reactor. Furthermore, feed of raw materials to the reactor and rate of recirculation between the reactor and crystallizer are balanced to maintain the liquor in the reactor close to saturation but free of crystals.

A stream of product slurry is pumped from crystallizer 18 by line 36 to a centrifuge 38 for further processing to a dry product.

The coarse sodium metabisulfite produced by the process of the present invention, reflects very good crystal growth, which we were unable to bring about in any other way. Thus, crystal growth rates are much better when the crystallization is carried out separately from the chemical reaction. Furthermore, the crystals were uniform and relatively free of dust and the odor of sulfur dioxide.

If desired, the warm liquor flowing from the reaction vessel to the crystallizer may be filtered so that no insoluble matter reaches the crystallizer and becomes associated with the product, which would reduce its quality and render it unusable in some processes making other products of high quality. This option represents a further improvement over the process of U.S. Pat. No. 3,995,015, as commercial grades of sodium carbonate contain insoluble solids, and the process of that patent provides no opportunity to remove these insoluble solids by filtration since both processing vessels contain slurries of solids and liquids.

It will be appreciated that the present invention is of particular benefit to a continuous crystallization process.

In the Example and Comparative Examples that follow and throughout this description and the claims set forth below, all percentages are by weight/weight, and all procedures are carried out at ambient temperature and pressure, unless otherwise specified.

EXAMPLE

Referring to FIG. 3, a sulfur dioxide-containing gas at a rate of 6.6 grams/min. of sulfur dioxide, and sodium carbonate at a rate of 5.5 grams/min. are simultaneously added to a reactor 50. The vertical, cylindrical, agitated reactor is 35.6 cm in diameter by 35.6 cm in height with a working volume of 30 liters. To prevent crystallization, the reactor is equipped with a steam coil 52 for the addition of heat.

The reactor contains sodium bisulfite solution at 59.7° C. without solids. The solution is close to saturation at 46.8% sodium bisulfite. The production rate of sodium metabisulfite is 6.1 grams/min. The pH is maintained at 5.0 by making slight adjustments to the sulfur dioxide flow, and the 59.7° C. temperature is maintained by heat from coil 52.

Liquor containing 46.8% sodium bisulfite at 59.7° C., is withdrawn from reactor 50 at a rate of 405 ml/min., and pumped to a crystallizer 54. The vertical, cylindrical, agitated crystallizer is 30.5 cm in diameter by 30.5 cm in height with a working volume of 16.7 liters, and is equipped with a water coil 56 for cooling and a baffle arrangement to permit overflow of mother liquor without carryover of suspended solids.

In the crystallizer, the liquor is cooled to 44.4° C. while in contact with a suspended bed of sodium metabisulfite crystals. The slight difference in solubility of sodium bisulfite at 44.4° C. and 59.7° C., which is 45.9% and 46.8%, respectively, forces crystallization. The liquor desupersaturates by growing on the existing crystals until the liquor decreases in strength to 45.9% sodium bisulfite solution. The pH of the crystallizer mother liquor is 5.3. Temperature in the crystallizer is maintained at 44.4° C. by cooling coil 56.

The sodium metabisulfite solids are withdrawn at intervals from the crystallizer, and the screen size of solids is determined on an hourly basis. FIG. 4 graphically depicts the percent −100 mesh screen versus the hours of operation. It is assumed that the total percent −100 mesh screen is a good indication of the relative fineness or coarseness of the product. A significant improvement is achieved, as the desired screen sizes are obtained. The product is a coarse, crystalline sodium metabisulfite relatively free of dust and sulfur dioxide odor. This result supports our theory that absorbing gas and simultaneously crystallizing product cause excessive nucleation which results in finer-sized crystals.

Mother liquor containing 45.9% sodium bisulfite at 44.4° C. overflows from crystallizer 54 and is recycled to reactor 50, where the cycle is repeated to produce a solution containing 46.8% sodium bisulfite at 59.7° C.

COMPARATIVE EXAMPLE 1

Practicing the technology taught by U.S. Pat. No. 3,995,015 and using a conventional two stage gasser-scrubber combination for reacting sulfur dioxide and sodium carbonate, a sulfur dioxide-containing gas at a rate of 14.8 grams/min. of sulfur dioxide, and sodium carbonate at a rate of 12.3 grams/min. are simultaneously added to reactor 50. The reactor contains 24% solids by volume of sodium metabisulfite in saturated sodium bisulfite solution. The pH in the reactor is maintained at 4.80 by making slight adjustments to the sulfur dioxide flow, and the temperature is maintained at 40.5° C.

In an effort to improve screen size by fines destruction, a side stream of the contents of reactor 50 is recirculated by means of a centrifugal pump at a rate of 275 ml/min. to a cyclone separator. The cyclone underflow is returned to the reactor. The cyclone overflow containing fine crystals is sent to an agitated, heated holding tank, in which the liquor is heated to 54° C. to dissolve the crystals. Afterwards, the heated liquor is overflowed to the reactor.

The sodium metabisulfite solids are withdrawn at intervals to maintain a steady percent solids, and the screen size of the dried solids is determined every hour. FIG. 4 graphically depicts the percent −100 mesh screen versus the hours of operation. It is assumed that the total percent −100 mesh screen is a good indication of the relative fineness or coarseness of the product. No significant improvement of screen size is obtained by separating fines with a cyclone and dissolving them with heat.

COMPARATIVE EXAMPLE 2

Practicing the technology taught by U.S. Pat. No. 3,995,015 and using a conventional two stage gasser-scrubber combination for reacting sulfur dioxide and sodium carbonate, a sulfur dioxide-containing gas at a rate of 14.8 grams/min. of sulfur dioxide, and sodium carbonate at a rate of 12.3 grams/min. are simultaneously added to reactor 50. The reactor contains 27% solids by volume of sodium metabisulfite in saturated sodium bisulfite solution. The pH in the reactor is maintained at 4.80 by making slight adjustments to the sulfur dioxide flow, and the temperature is maintained at 39.9° C.

In another effort to improve screen size by fines destruction, a side stream of the reactor contents is recirculated by means of a centrifugal pump at a rate of 350 ml/min. to a cyclone. Cyclone underflow is returned to reactor 50. Cyclone overflow containing some fine crystals is passed to an agitated, heated holding tank in which it is heated to 54.3° C. to dissolve the crystals. To ensure that no nuclei are present, the overflow stream from this vessel is filtered, and then returned to reactor 50.

The sodium metabisulfite solids are withdrawn at intervals to maintain a steady percent solids, and the screen size of the dried solids is determined every hour. FIG. 4 graphically depicts the percent −100 mesh screen versus the hours of operation. It is assumed that the total percent −100 mesh screen is a good indication of the relative fineness or coarseness of the product. No significant improvement of screen size is obtained by separating fines with a cyclone, dissolving them with heat, and filtering the resulting liquor.

Three other modifications to the technology taught by U.S. Pat. No. 3,995,015 were tried to improve screen size by fines destruction. These techniques involved (1) heating a recycle stream of reactor slurry to selectively dissolve fine crystals; (2) separating fines with a settler, dissolving them with water, and returning the overflow to the reactor; and (3) separating fines with a settler, dissolving them with heat, and returning the overflow to the reactor. However, the crystal size distribution remained about the same and much below that desired in a product with minimum nuisance in handling. Therefore, we have postulated that in this system, to react materials to form the product and simultaneously to crystallize the product cause a certain amount of nucleation; and that if a portion of these nuclei are separated and dissolved, more form spontaneously so that the total number of nuclei remains about the same.

The above example is illustrative of the present invention. It is to be understood that this example is not in any way to be interpreted as limiting the scope of the invention. Rather, it is intended that the scope of the invention be defined by the claims set forth below. We contemplate that the invention as hereinafter claimed, will be subject to various modifications, which modifications are within the scope thereof.

Industrial Applicability

The process of this invention provides a coarse sodium metabisulfite.

We claim:

1. An improved process for the manufacture of sodium metabisulfite comprising
    in a first vessel, forming a solution of sodium bisulfite close to saturation from a reaction liquor which is maintained at a pH in the range of about 4.8 to 5.2 and at an elevated temperature of between about 50° to 60° through the addition of heat, which elevated temperature prevents sodium metabisulfite crystallization from said solution;
    in a separate vessel, crystallizing sodium metabisulfite from said solution at a less elevated temperature of between about 20° to 50° C., without chemical alteration and without pH adjustment; and
    recovering the sodium metabisulfite.

2. The process of claim 1, further comprising feeding the mother liquor remaining after the crystallization step, to said first vessel.

3. The process of claim 1 in which the elevated temperature is about 60° C.

4. The process of claim 1 in which the reaction liquor is maintained at a pH in the range of about 5.0 to 5.2.

5. The process of claim 3 further comprising feeding the mother liquor remaining after the crystallization step to said first vessel.

\* \* \* \* \*